United States Patent
Yamamoto (10) Patent No.: US 6,429,905 B1
(45) Date of Patent: Aug. 6, 2002

(54) AUTOMATIC WHITE BALANCE ADJUSTMENT SYSTEM

(75) Inventor: Kazuhiko Yamamoto, Osaka (JP)

(73) Assignee: Funai Electric Co., Ltd., Osaka (JP)

( * ) Notice: Subject to any disclaimer, the term of this patent is extended or adjusted under 35 U.S.C. 154(b) by 0 days.

(21) Appl. No.: 09/410,451

(22) Filed: Oct. 1, 1999

(30) Foreign Application Priority Data

Oct. 1, 1998 (JP) .......................................... 10-007650

(51) Int. Cl.⁷ ................................................ H04N 9/73
(52) U.S. Cl. ..................................... 348/656; 348/655
(58) Field of Search ............................... 348/655–658, 348/630; H04N 9/73

(56) References Cited

U.S. PATENT DOCUMENTS

| | | | | |
|---|---|---|---|---|
| 4,692,793 A | * | 9/1987 | Tamura et al. | 348/656 |
| 4,748,497 A | * | 5/1988 | Sengoku | 348/656 |
| 4,930,004 A | * | 5/1990 | Yamamoto et al. | 348/656 |

FOREIGN PATENT DOCUMENTS

| | | | | |
|---|---|---|---|---|
| JP | Unex. Sho. 60-206291 | | 10/1985 | |
| JP | 0245688 | * | 10/1986 | ............ H04N/9/73 |
| JP | Unex. Sho. 63-120578 | | 5/1988 | |
| JP | Unex Hei. 3-185992 | | 8/1991 | |
| JP | Unex. Hei. 7-170529 | | 7/1995 | |
| JP | Unex. Hei. 8-2108 | | 1/1996 | |
| JP | 008163582 | * | 6/1996 | ............ H04N/9/73 |
| JP | Unex. Hei. 9-271037 | | 10/1997 | |

* cited by examiner

*Primary Examiner*—Victor R. Kostak
(74) *Attorney, Agent, or Firm*—Lackenbach Siegel, LLP (57) ABSTRACT

An automatic white balance adjustment system including a color signal reproduction circuit having a white balance adjustment section, a picture tube drive circuit, a picture tube, a cathode voltage detection circuit, a storage circuit, and a control circuit. The cathode voltage detection circuit detects a cathode voltage applied to a red cathode electrode, a cathode voltage applied to a green cathode electrode, and a cathode voltage applied to a blue cathode electrode of the picture tube. In the storage circuit, there are stored in advance comparison reference values set for the RGB primary color signals in order to control the RGB primary color signals so as to achieve a white balance in a given ratio. When detection pulses of predetermined IRE values corresponding to the respective RGB primary color signals are output from the picture tube drive circuit, the control circuit reads the red cathode voltage, the green cathode voltage, and the blue cathode voltage, all being detected by the cathode voltage detection circuit. Then, the control circuit compares the thus-read detection voltages with the corresponding comparison reference values stored in the storage circuit so as to correspond to the respective RGB primary color signals, to thereby control the white balance adjustment section of the color signal reproduction circuit such that the detected voltages coincide with the comparison reference values.

4 Claims, 5 Drawing Sheets

AUTOMATIC WHITE BALANCE ADJUSTMENT SYSTEM

BACKGROUND OF THE INVENTION

1. Field of the Invention

The present invention relates to an automatic white balance adjustment system, and more particularly, to an automatic white balance adjustment system, wherein a red cathode voltage detected by a cathode voltage detection circuit, a green cathode voltage detected by the cathode voltage detection circuit, and a blue cathode voltage detected by the same are read by an analog-to-digital (A/D) signal conversion port of a microcomputer, and the readings are processed by means of software provided within the microcomputer.

2. Description of the Related Art

Various types of automatic white balance adjustment systems for use with a television set have already been proposed.

For example, in an automatic white balance adjustment system described in Japanese Patent Unexamined Publication No. Hei. 7-170529, cathode currents corresponding to detection pulses cyclically inserted in a predetermined horizontal period within a vertical blanking period are measured. The thus-measured currents are compared with a reference value, thereby outputting comparison results. By means of the thus-output comparison results, the cathode currents corresponding to detection pulses are controlled so as to become substantially equal to the reference value.

In another automatic white balance adjustment system described in Japanese Patent Unexamined Publication No. Hei. 9-271037, at the time of adjustment a reference white level voltage and a reference black level voltage are imparted to a d.c. voltage level/gain adjustment circuit at predetermined timings. Detected cathode currents are compared with a reference current, and data pertaining to comparison results are produced and stored in a non-volatile memory. Further, the data are read from the memory and are supplied to the d.c. voltage level/gain adjustment circuit as data for adjustment.

As described above, various types of systems for adjusting the white balance of the television set have already been proposed. However, each of the systems uses a single value as a reference value for determining and adjusting all the primary color signals; i.e., RGB signals. For this reason, desired color temperatures cannot necessarily be achieved.

SUMMARY OF THE INVENTION

The present invention has been made to solve the above problem, and an object of the present invention is to provide an automatic white balance adjustment system arranged so as to control the mixing ratio of the respective RGB primary color signals to a certain ratio, by separately setting the reference values for the respective primary colors R, G, and B.

To achieve the above object, according to the present invention, there is provided an automatic white balance adjustment system comprising: a color signal reproduction circuit which demodulates respective RGB primary color signals from a composite video signal and has a white balance adjustment section; a picture tube drive circuit which drives and displays images on a picture tube so as to correspond to the RGB primary color signals reproduced by the color signal reproduction circuit; a cathode voltage detection circuit which detects a cathode voltage applied to a red cathode electrode, a cathode voltage applied to a green cathode electrode, and a cathode voltage applied to a blue cathode electrode of the picture tube; a storage circuit which stores in advance comparison reference values set for the RGB primary color signals in order to control the RGB primary color signals so as to achieve a white balance in a given ratio; and a control circuit which, when detection pulses of predetermined IRE values corresponding to the respective RGB primary color signals are output from the picture tube drive circuit, reads the red cathode voltage, the green cathode voltage, and the blue cathode voltage, all being detected by the cathode voltage detection circuit, and compares the thus-read detection voltages with the corresponding comparison reference values stored in the storage circuit, to thereby control the white balance adjustment section of the color signal reproduction circuit such that the detected voltages coincide with the corresponding comparison reference values.

DETAILED DESCRIPTION OF THE PREFERRED EMBODIMENTS

With reference to the accompanying drawings, a preferred embodiment of the present Invention will now be described.

Figure 1:
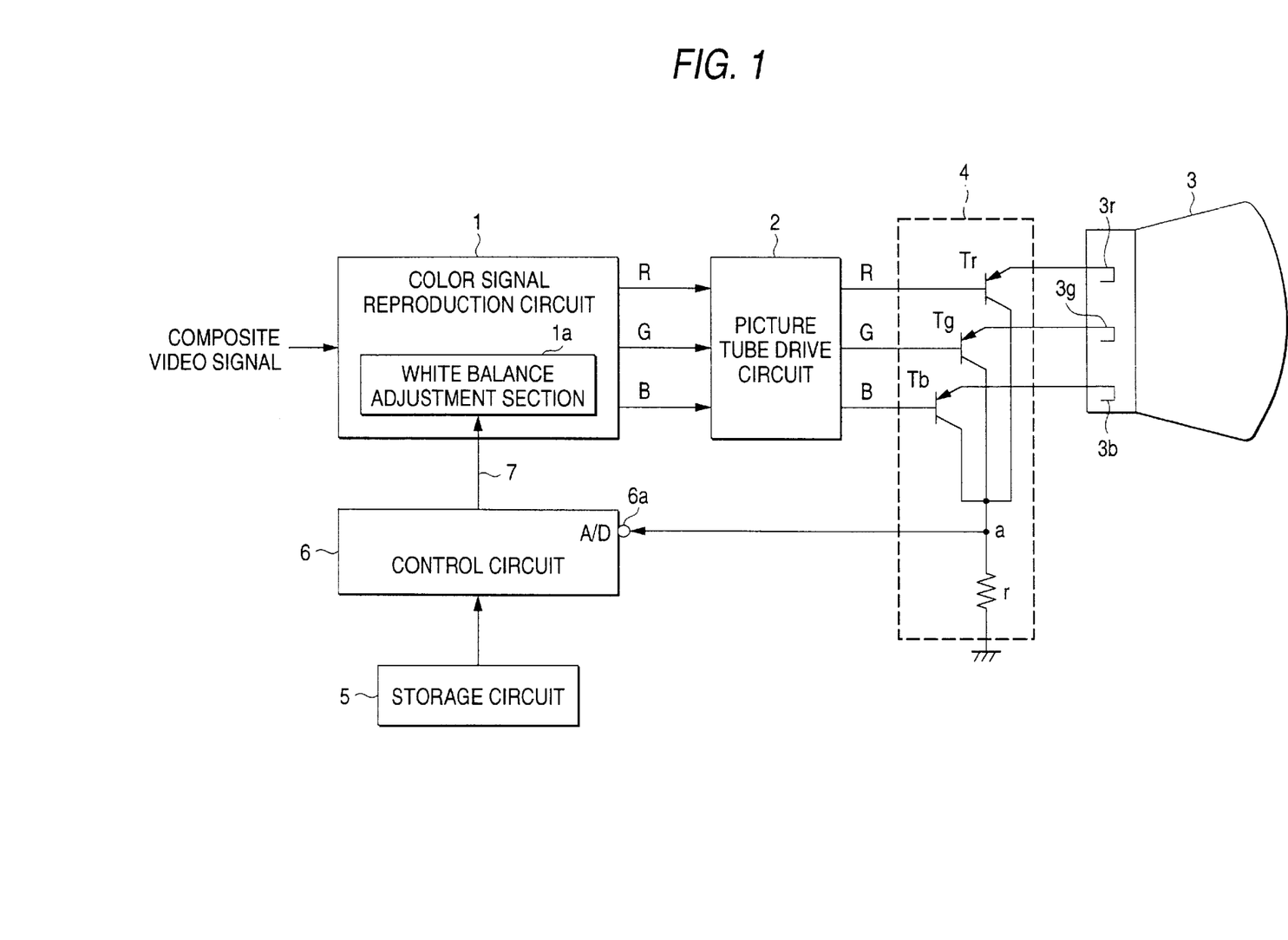
FIG. 1 is a block diagram showing the electrical configuration of an automatic white balance adjustment system according to the present invention.

FIG. 1 is a block diagram showing the electrical configuration of an automatic white balance adjustment system according to the present Invention.

The automatic white balance adjustment system comprises a color signal reproduction circuit 1, a picture tube drive circuit 2, a picture tube 3, a cathode voltage detection circuit 4, a storage circuit 5, and a control circuit 6. The color signal reproduction circuit 1 demodulates the respective RGB primary color signals from a composite video signal and has a white balance adjustment section 1a. The picture tube drive circuit 2 drives and displays images on the picture tube 3 so as to correspond to the RGB primary color signals reproduced by the color signal reproduction circuit 1. The cathode voltage detection circuit 4 detects a cathode voltage applied to a red cathode electrode, a cathode voltage applied to a green cathode electrode, and a cathode voltage applied to a blue cathode electrode of the picture tube 3. In the storage circuit 5, there are stored in advance comparison reference values set for the respective primary color signals in order to control the RGB primary color signals so as to achieve a white balance in a given ratio. When detection pulses of predetermined IRE values corresponding to the respective RGB primary color signals are output from the picture tube drive circuit 2, the control circuit 6 reads the red cathode voltage, the green cathode voltage, and the blue cathode voltage, all being detected by the cathode voltage detection circuit 4. The control circuit 6 compares the thus-read detection voltages with the corresponding comparison reference values stored in the storage circuit 5 so as to correspond to the respective RGB primary color signals, to thereby control the white balance adjustment section 1*a* of the color signal reproduction circuit 1 such that the detected voltages coincide with the comparison reference values.

The composite video signal input to the color signal reproduction circuit 1 corresponds to a composite video signal output from an unillustrated tuner circuit (comprising a tuner, a video detection circuit, and relevant circuits) or a composite video signal reproduced by means of an unillustrated video cassette recorder (VCR).

The color signal reproduction circuit 1 demodulates the RGB primary color signals from the thus-obtained composite video signal and, with the aid of the white balance adjustment section 1*a*, adjusts a cut-off voltage or a drive voltage. Although not illustrated, the white balance adjustment section 1*a* comprises amplifier circuits provided so as to correspond to the respective RGB primary color signals. The white balance is adjusted by controlling the degree of amplification of the respective amplifier circuits.

Although not illustrated, the picture tube drive circuit 2 comprises drive amplifier circuits provided so as to correspond to the respective RGB primary color signals.

The cathode voltage detection circuit 4 comprises three transistors Tr, Tg, and Tb corresponding to the respective primary colors RGB; and a detection resistor "r" whose one end is connected to the collectors of the respective transistors Tr, Tg, and Tb and whose other end is grounded. The red primary color signal is supplied to the base of the transistor Tr; the green primary color signal is supplied to the base of the transistor Tg; and the blue primary color signal is supplied to the base of the transistor Tb. The emitter of the transistor Tr is connected to a cathode 3*r*; the emitter of the transistor Tg is connected to a cathode 3*g*; and the emitter of the transistor Tb is connected to a cathode 3*b*. A node "a" between the collectors of the transistors Tr, Tg, and Tb and the detection resistor "r" is connected to an analog-to-digital signal port 6*a* of the control circuit 6.

When detection pulses of predetermined IRE values corresponding to the respective RGB primary color signals are output from the picture tube drive circuit 2, the control circuit 6 reads the red cathode voltage, the green cathode voltage, and the blue cathode voltage, all being detected by the cathode voltage detection circuit 4, with the analog-to-digital signal port 6*a*. The thus-read voltage values are compared with the corresponding comparison reference values for the primary color signals stored in the storage circuit 5. The white balance adjustment section 1*a* is controlled by changing a control value of an I$^2$C bus 7 such that the detected voltage values coincide with the corresponding comparison reference values.

Figure 2:
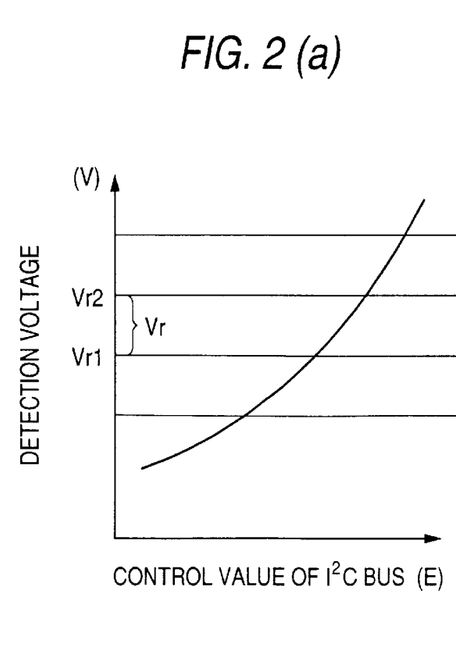
FIG. 2(a) is a graph showing one example of reference voltage widths corresponding to a red signal.
FIG. 2(b) is a graph showing one example of reference voltage widths corresponding to a green signal.
FIG. 2(c) is a graph showing one example of reference voltage widths corresponding to a blue signal.

In order to control the RGB primary color signals at a given ratio so as to achieve a white balance, comparison reference values set for the respective primary color signals are stored in advance in the storage circuit 5. As shown in FIGS. 2(*a*) to 2(*c*), the comparison reference values are set as given reference voltage widths Vr, Vg, and Vb corresponding to the respective RGB primary color signals. Specifically, the reference voltage width Vr corresponds to a width between voltage Vr1 and voltage Vr2; the reference voltage width Vg corresponds to a width between voltage Vg1 and voltage Vg2; and the reference voltage width Vb corresponds to a width between voltage Vb1 and voltage Vb2. For the sake of simplicity, in this embodiment, the upper voltage Vg2 of the reference voltage width Vg is set to be equal to the lower voltage Vr1 of the reference voltage width Vr; and the upper voltage Vr2 of the reference voltage width Vr is set to be equal to the lower voltage Vb1 of the reference voltage width Vb. FIGS. 2(*a*) to 2(*c*) provide one example of the values of the reference voltage values Vr, Vg, and Vb and the relationship among them. The values and the relationship may vary from TV set to TV set. Therefore, appropriate values are to be determined beforehand with reference to test results or the like. In practice, overlaps naturally arise among the ranges of the reference voltage widths Vr, Vg, and Vb.

Figure 3:
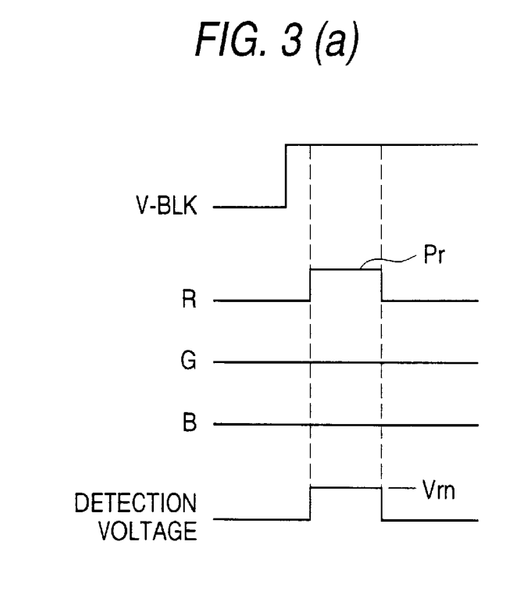
FIG. 3(a) is a timing chart showing timings at which a detection pulse corresponding to the red signal is output.
FIG. 3(b) is a timing chart showing timings at which a detection pulse corresponding to the green signal is output.
FIG. 3(c) is a timing chart showing timings at which a detection pulse corresponding to the blue signal is output.
Figure 4:
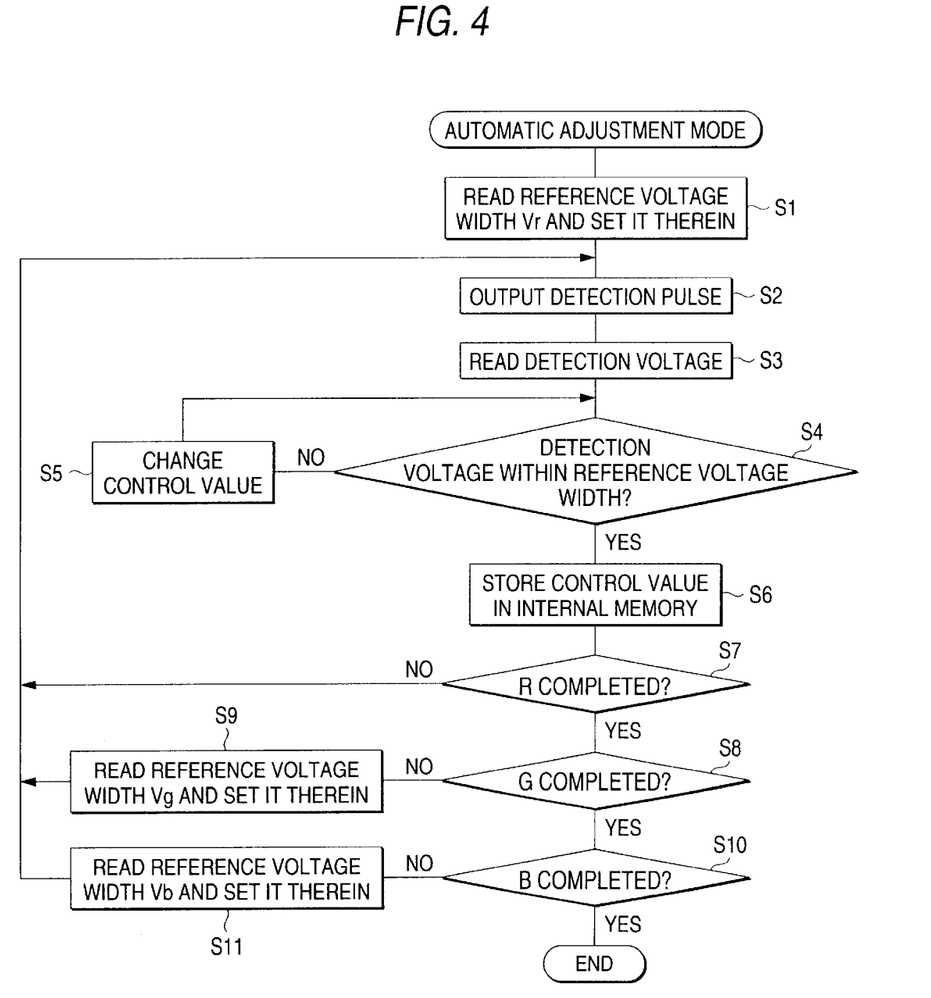
FIG. 4 is a flowchart for describing the operation of an embodiment of the automatic white balance adjustment system according to the present invention.

The adjustment operation of the automatic white balance adjustment system having the foregoing configuration will be described with reference to timing charts shown in FIGS. 3(*a*) to 3(*c*) and with a flowchart shown in FIG. 4. The time at which a white balance adjustment operation is performed corresponds to shipment of the TV set. Subsequently, the time at which the white balance adjustment operation is effected can be arbitrarily set, in consideration of changes in the picture tube over time. For instance, the white balance adjustment operation may be performed every time the power is turned on or every time a given period of time elapses. At the time of activation of the automatic white balance adjustment mode, detection pulses of predetermined IRE values corresponding to the respective RGB primary colors are output from the picture tube drive circuit 2. The detection pulses are output while being inserted into a predetermined horizontal period within a vertical blanking period. Detection pulses include a voltage pulse of 5IRE and a voltage pulse of 10IRE. In this embodiment, a description will be given of a case where on a voltage pulse of 5IRE is output.

At the time of activation of the automatic white balance adjustment mode, the control circuit 6 reads the reference voltage width Vr corresponding to the R color signal (see FIG. 2 (*a*)) from the storage circuit 5 and sets the thus-read reference voltage width Vr in the internal memory thereof (step Si). As shown in FIG. 3(*a*), the white balance adjustment section 1*a* of the color signal reproduction circuit 1 is controlled, thereby causing the picture tube drive circuit 2 to output a detection pulse Pr of 5IRE corresponding to the R color signal while the pulse is inserted into a predetermined horizontal period within a vertical blanking period (V-BLK) (step S2). The cathode voltage detection circuit 4 detects the detection pulse Pr, and the voltage Vrn detected from the pulse Pr is read by the analog-to-digital signal port 6*a* of the control circuit 6 (step S3). The control circuit 6 compares the thus-read detection voltage Vrn with the reference voltage width Vr (whose lower voltage is Vr1 and whose higher voltage is Vr2) set in the control circuit 6 (step S4). The white balance adjustment section 1*a* is controlled by changing a control value of the I$^2$C bus 7, such that the detection voltage Vrn enters the range of the reference voltage width Vr (defined between the lower voltage Vr1 and the higher voltage Vr2) (step S5). A control value Er at which the detection voltage Vrn enters the range of the reference voltage width Vr is stored in the internal memory (step S6).

Subsequently, the control circuit 6 reads the reference voltage width Vg corresponding to the G color signal from the storage circuit 5 (see FIG. 2(b)) and sets the thus-read reference voltage width in the internal memory thereof (Steps S7, S8, and S9). As shown in FIG. 3(b), the white balance adjustment section 1a of the color signal reproduction circuit 1 is controlled, thereby causing the picture tube drive circuit 2 to output a detection pulse Pg of 5IRE corresponding to the G color signal while the pulse is inserted into a predetermined horizontal period within a vertical blanking period (V-BLK) (step S2). The cathode voltage detection circuit 4 detects the detection pulse Pg, and the voltage Vgn detected from the pulse Pg is read by the analog-to-digital signal port 6a of the control circuit 6 (step S3). The control circuit 6 compares the thus-read detection voltage Vgn with the reference voltage width Vg (whose lower voltage is Vg1 and whose higher voltage is Vg2) set in the control circuit 6 (step S4). The white balance adjustment section 1a is controlled by changing a control value of the $I^2C$ bus 7, such that the detection voltage Vgn enters the range of the reference voltage width Vg (defined between the lower voltage Vg1 and the higher voltage Vg2) (step S5). A control value Eg at which the detection voltage Vgn enters the range of the reference voltage width Vg is stored in the internal memory (step S6).

Subsequently, the control circuit 6 reads the reference voltage width Vb corresponding to the B color signal from the storage circuit 5 (see FIG. 2(c)) and sets the thus-read reference voltage width (Steps S7, S8, S10, and S11) in the internal memory thereof. As shown in FIG. 3(c), the white balance adjustment section 1a of the color signal reproduction circuit 1 is controlled, thereby causing the picture tube drive circuit 2 to output a detection pulse Pb of 5IRE corresponding to the B color signal while the pulse is inserted into a predetermined horizontal period within a vertical blanking period (V-BLK) (step S2). The cathode voltage detection circuit 4 detects the detection pulse Pb, and the voltage Vbn detected from the pulse Pb is read by the analog-to-digital signal port 6a of the control circuit 6 (step S3). The control circuit 6 compares the thus-read detection voltage Vbn with the reference voltage width Vb (whose lower voltage is Vb1 and whose higher voltage is Vb2) set in the control circuit 6 (step S4). The white balance adjustment section 1a is controlled by changing a control value of the $I^2C$ bus 7, such that the detection voltage Vbn enters the range of the reference voltage width Vb (defined between the lower voltage Vb1 and the higher voltage Vb2) (step S5). A control value Eb at which the detection voltage Vbn enters the range of the reference voltage width Vb is stored in the internal memory (step S6).

In subsequent processes, the control circuit 6 controls the white balance on the basis of the control values Er, Eg, an Eb stored in the internal memory.

As described above, the automatic white balance adjustment system according to the present invention is characterized in that the comparison reference values (reference voltage widths Vr, Vg, and Vb) are set separately for the respective RGB colors, and that the mixing ratio of the respective RGB primary colors is controlled to a predetermined ratio so as to achieve a white balance.

In the above embodiment, the comparison reference values have been described as reference voltage widths. If the analog-to-digital signal port 6a of the control circuit 6 has sufficient resolution, the voltage Vr1 shown in FIG. 2 (a), for example, may be set as the comparison reference value for R; the voltage Vg1 shown in FIG. 2 (b) may be set as the comparison reference value for G; and the voltage Vb1 shown in FIG. 2(c) may be set as the comparison reference value for B. In this case, the control circuit 6 controls the white balance adjustment section 1a by changing the control value of the $I^2C$ bus 7, such that the detection voltages Vrn, Vgn, and Vbn coincide with the corresponding comparison reference values Vr1, Vg1, and Vb1.

Figure 5:
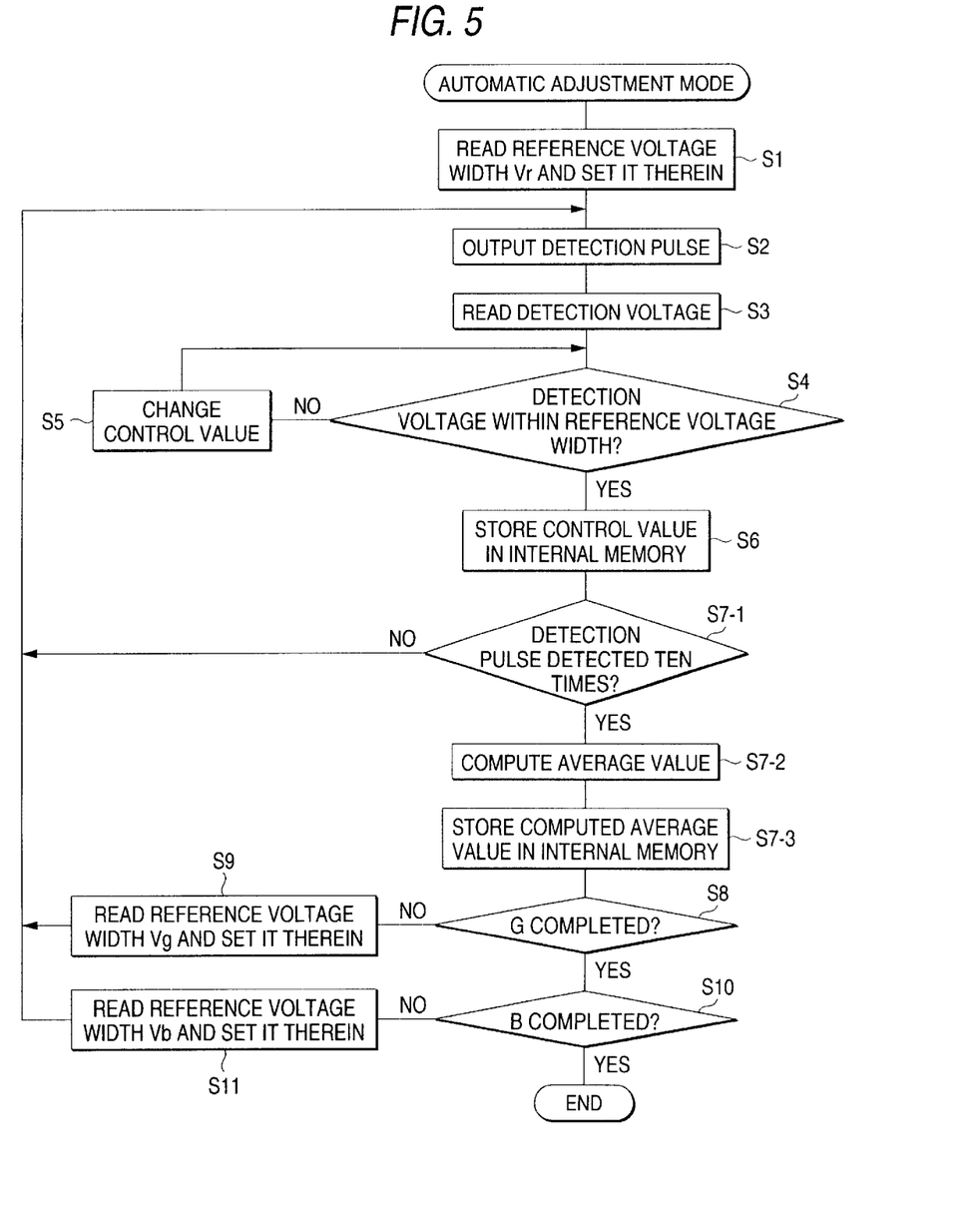
FIG. 5 is a flowchart for describing the operation of another embodiment of the automatic white balance adjustment system according to the present invention.

Further, in the above embodiment, the white balance adjustment for the respective RGB primary colors is effected by the detection pulses being output only one time. However, if the thus-output detection pulses are affected by noise or the like, appropriate white balance adjustment cannot be effected. In consideration of such a case, in the following embodiment, the white balance adjustment for the respective RGB primary colors is effected a plurality of times (e.g., ten times). The embodiment will now be described with reference to a flowchart shown in FIG. 5. The flowchart shown in FIG. 5 is identical with that shown in FIG. 4, except that step S7 provided in the flowchart shown in FIG. 4 is replaced with steps S7-1 to S7-3 in the flowchart shown in FIG. 5. Like processing blocks are assigned like reference characters.

At the time of activation of the automatic white balance adjustment mode, the control circuit 6 outputs detection pulses corresponding to the respective RGB primary color signals, for example, ten times while each of the pulses is inserted into a predetermined horizontal period within the vertical blanking (V-BLK). In short, a detection pulse of identical color signal is output within each of continuous ten vertical blanking periods (V-BLK).

Every time, the detection pulse Pr corresponding to the R color signal, for example, is output from the picture tube drive circuit 2, the control circuit 6 changes the control value of the $I^2C$ bus 7 to the control value Er1, in the same manner as in the previous embodiment. The control value Er1 is stored in the unillustrated internal memory (steps S1 to S6). Such processing is repeated every time the detection pulse Pr corresponding to the R color signal is output from the picture tube drive circuit 2. Control values corresponding to ten times (Er1, Er2, ... Er10) are stored (step S7-1), and an average value Er0 of the control values, which are stored in the internal memory at that time, is computed (step S7-2). The thus-computed average control value Er0 is stored in the internal memory as an actual control value corresponding to the R signal (step S7-3).

Similarly, every time the detection pulse Pg corresponding to the G color signal is output from the picture tube drive circuit 2, the control circuit 6 changes the control value of the $I^2C$ bus 7 to the control value Eg1, in the same manner as in the previous embodiment. The control value Eg1 is stored in the unillustrated internal memory (steps S8, S9, S2 to S6). Such processing is repeated every time the detection pulse Pg corresponding to the G color signal is output from the picture tube drive circuit 2. Control values corresponding to ten times (Eg1, Eg2, ... Eg10) are stored (step S7-1), and an average value Eg0 of the control values, which are stored in the internal memory at that time, is computed (step S7-2). The thus-computed average control value Eg0 is stored in the internal memory as an actual control value corresponding to the G signal (step S7-3).

Similarly, every time the detection pulse Pb corresponding to the B color signal is output from the picture tube drive circuit 2, the control circuit 6 changes the control value of the $I^2C$ bus 7 to the control value Eb1, in the same manner as in the previous embodiment. The control value Eb1 is stored in the unillustrated internal memory (steps S10, Si, S2 to S6). Such processing is repeated every time the detection pulse Pb corresponding to the B color signal is output from the picture tube drive circuit 2. Control values corresponding to ten times (Eb1, Eb2, . . . Eb10) are stored (step S7-1), an average value Eb0 of the control values, which are stored in the internal memory at that time, is computed (step S7-2) The thus-computed average control value Eb0 is stored in the internal memory as an actual control value corresponding to the B signal (step S7-3).

As described above, according to the present embodiment, even when the control value is affected by noise or the like, the control value is obtained a plurality of times, and an average value of the thus-collected control values is computed, thus minimizing the influence by the noise or the like.

In each of the previous embodiments, the thus-computed average control value is stored in the internal memory of the control circuit 6. However, alternatively, the average control value may be stored in a predetermined location of the storage circuit 5. In this case, as a matter of course, bi-directional connection is established between the control circuit 6 and the storage circuit 5.

Further, in each of the previous embodiments, white balance is adjusted through use of the voltage pulse of 5IRE. Needless to say, in the same manner, white balance can be adjusted through use of a voltage pulse of 10IRE.

So long as the white balance adjustment according to the present invention is periodically effected, optimum white balance can be achieved in spite of changes in a picture tube with time as a result of use of the picture tube over a long period of time, so that quality of the picture tube can be maintained over a long period of time.

The present invention provides an automatic white balance adjustment system comprising: a color signal reproduction circuit which demodulates respective RGB primary color signals from a composite video signal and has a white balance adjustment section; a picture tube drive circuit which drives and displays images on a picture tube so as to correspond to the RGB primary color signals reproduced by the color signal reproduction circuit; a cathode voltage detection circuit which detects a cathode voltage applied to a red cathode electrode, a cathode voltage applied to a green cathode electrode, and a cathode voltage applied to a blue cathode electrode of the picture tube; a storage circuit which stores in advance comparison reference values set for the RGB primary color signals in order to control the RGB primary color signals so as to achieve a white balance in a given ratio; and a control circuit which, when detection pulses of predetermined IRE values corresponding to the respective RGB primary color signals are output from the picture tube drive circuit, reads the red cathode voltage, the green cathode voltage, and the blue cathode voltage, all being detected by the cathode voltage detection circuit, and compares the thus-read detection voltages with the corresponding comparison reference values stored in the storage circuit, to thereby control the white balance adjustment section of the color signal reproduction circuit such that the detected voltages coincide with the corresponding comparison reference values. That is, white balance is adjusted through use of the comparison reference values set for the respective primary color signals, thus controlling the ratio of mixture of RGB to an optimum ratio so as to realize the truest possible white.

What is claimed is:

1. An automatic white balance adjustment system comprising:
    a color signal reproduction circuit which demodulates respective RGB primary color signals from a composite video signal and has a white balance adjustment section;
    a picture tube drive circuit which drives and displays images on a picture tube so as to correspond to the RGB primary color signals reproduced by said color signal reproduction circuit;
    a cathode voltage detection circuit which detects a cathode voltage applied to a red cathode electrode, a cathode voltage applied to a green cathode electrode, and a cathode voltage applied to a blue cathode electrode of the picture tube;
    a storage circuit which stores in advance comparison reference values set for the RGB primary color signals in order to control the RGB primary color signals so as to achieve a white balance is a given ratio; and
    a control circuit which, when detection pulses of predetermined IRE values corresponding to the respective RGB primary color signals are output from said picture tube drive circuit, reads the red cathode voltage, the green cathode voltage, and the blue cathode voltage, all being detected by said cathode voltage detection circuit, and compares the thus-read detection voltages with the corresponding comparison reference values stored in said storage circuit, to thereby control the white balance adjustment section of said color signal reproduction circuit such that the detected voltages coincide with the corresponding comparison reference values, wherein the comparison reference values stored in said storage circuit are set to predetermined reference voltage widths corresponding to the respective RGB primary colors, and said control circuit includes means for controlling the white balance adjustment section such that a detection voltage enters a range of the correponding reference voltage width.

2. The automatic white balance adjustment system as defined in claim 1, wherein said control circuit includes an analog-to-digital signal port for reading each of the red, green, and blue cathode voltages detected by said cathode voltage detection circuit, and means for controlling the white balance adjustment section by changing a control value such that a detection voltage coincides with the corresponding reference value or enters the range of the corresponding reference voltage width.

3. The automatic white balance adjustment system as defined in claim 2, wherein said control circuit includes: storage means for storing a control value, at which said control circuit controls the white balance adjustment section such that every time detection pulses corresponding to the respective RGB primary color signals are output from said picture tube drive circuit a plurality of times at a predetermined time interval, the detection voltage coincides with the corresponding comparison reference value or enters the range of the corresponding reference voltage width; and means for controlling the white balance adjustment section while an average value of the control values is taken as an actual control value.

4. An automatic white balance adjustment system comprising:
    a color signal reproduction circuit which demodulates respective RGB primary color signals from a composite video signal and has a white balance adjustment section;
    a picture tube drive circuit which drives and displays images on a picture tube so as to correspond to the RGB primary color signals reproduced by said color signal reproduction circuit;
    a cathode voltage detection circuit which detects a cathode voltage applied to a red cathode electrode, a cathode voltage applied to a green cathode electrode, and a cathode voltage applied to a blue cathode electrode of the picture tube;

a storage circuit which stores in advance comparison reference values set for the RGB primary color signals in order to control the RGB primary color signals so as to achieve a white balance is a given ratio; and a control circuit which, when detection pulses of predetermined IRE values corresponding to the respective RGB primary color signals are output from said picture tube drive circuit, reads the red cathode voltage, the green cathode voltage, and the blue cathode voltage, all being detected by said cathode voltage detection circuit, and compares the thus-read detection voltages with the corresponding comparison reference values stored in said storage circuit, to thereby control the white balance adjustment section of said color signal reproduction circuit such that the detected voltages coincide with the corresponding comparison reference values, wherein the comparison reference values stored in said storage circuit are set to predetermined reference voltage widths corresponding to the respective RGB primary colors, and said control circuit includes means for controlling the white balance adjustment section such that a detection voltage enters a range of the corresponding reference voltage width, wherein said control circuit includes an analog-to-digital signal port for reading each of the red, green, and blue cathode voltages detected by said cathode voltage detection circuit, and means for controlling the white balance adjustment section by changing a control value such that a detection voltages coincides with the corresponding reference value or enters the range of a corresponding reference voltage width, and wherein said control circuit includes: storage means for storing a control value, at which said control circuit controls the white balance adjustment section such that every time detection pulses corresponding to the respective RGB primary color signals are output from said picture tube drive circuit a plurality of times at a predetermined time interval, the detection voltage coincides with the corresponding comparison reference value or enters the range of the corresponding reference voltage width; and means for controlling the white balance adjustment section while an average value of the control values is taken as an actual control value.

* * * * *